June 9, 1925.
E. A. KILMER
BELT GUIDE
Filed Oct. 18, 1924
1,541,718
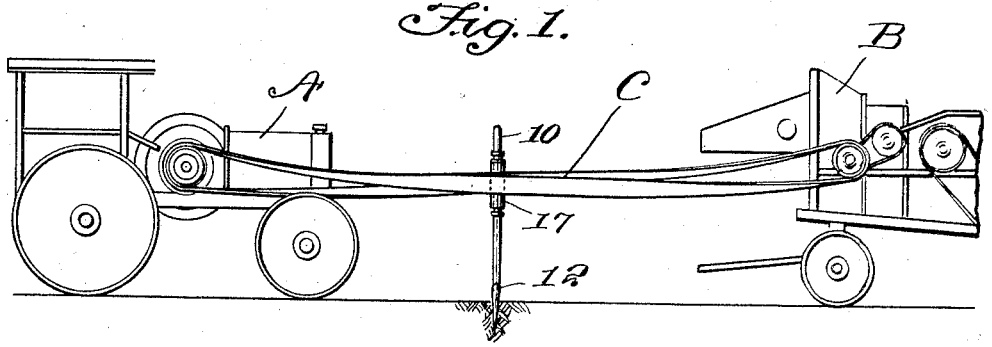
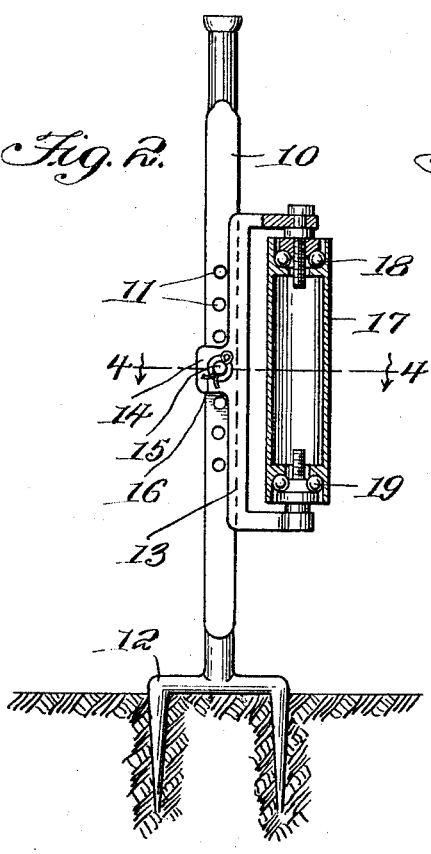
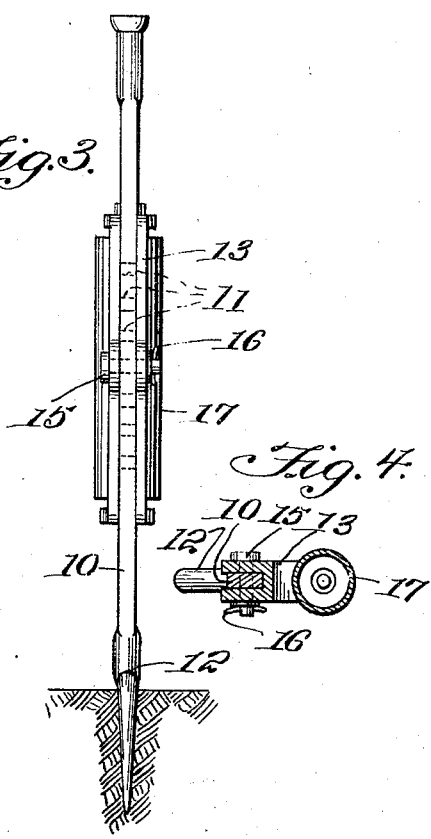
Elmer A. Kilmer
INVENTOR
BY Victor J. Evans
ATTORNEY
WITNESS: J. T. L. Wright Patented June 9, 1925.

1,541,718

UNITED STATES PATENT OFFICE.

ELMER A. KILMER, OF HIRAM, OHIO.

BELT GUIDE.

Application filed October 18, 1924. Serial No. 744,449.

*To all whom it may concern:*

Be it known that I, ELMER A. KILMER, a citizen of the United States, residing at Hiram, in the county of Portage and State of Ohio, have invented new and useful Improvements in Belt Guides, of which the following is a specification.

This invention relates to belt guides, and contemplates the provision of a device primarily intended for out door work, as for instance, in conjunction with a belt providing a driving connection between a tractor and an agricultural machine or the like.

In carrying out the invention, I contemplate the use of a standard designed to be partly driven into the ground to be supported thereby, and a guide roller supported on a bracket which is adjustably mounted upon the standard, whereby said roller can be conveniently and quickly arranged in proper working relation with the belt with which it is to be used.

The nature and advantages of the invention will be better understood when the following detail description is read in connection with the accompanying drawing, the invention residing in the construction, combination and arrangement of parts as claimed.

In the drawing forming part of this application, the like numerals of reference indicate similar parts in the several views, and wherein:

Figure 1 is a view showing how the belt guide is arranged with relation to the belt, the latter providing an operative connection between a tractor and agricultural machine.

Figure 2 is a view in elevation of the belt guide showing the roller and bracket in section.

Figure 3 is a view taken at a right angle to Figure 2, and

Figure 4 is a sectional view taken on line 4—4 of Figure 2.

Referring to the drawings in detail, A indicates generally a tractor, and B an agricultural machine of any well-known construction, while C represents an endless belt which is trained over a suitable pulley to provide a driving connection from the tractor to the machine as will be readily understood.

As above stated the above guide forming the subject matter of the present invention is primarily intended to be used out of doors in connection with agricultural machines or the like, and embodies amongst other features a standard 10 which may be constructed from any suitable material and varying in size without departing from the spirit of the invention, and which standard is formed with a plurality of openings 11 for a purpose to be hereinafter described. Carried by the lower end of this standard, and preferably forming a part thereof, is an inverted U-shaped member 12, the parallel limbs of which are tapered to form prongs which are adapted to be driven into the ground to support the device for use, and to resist any tendency of the belt from moving the device away therefrom. A bracket 13 is supported upon the standard 10, and for this purpose the said bracket is formed with an apertured lug 14, the aperture of which may be arranged to register with any of the openings 11 in such standard, to receive a headed bolt 15 which is held in place by means of a cotter pin 16. Journaled on the bracket 13 is a roller 17 which preferably consists of a short length of pipe, the roller being journaled in ball bearings 18 and 19 respectively, the former being adjustable as shown. This permits the bearings being adjusted to compensate for wear.

In practice, the standard is driven into the ground in the manner shown in Figure 2, with the roller 17 arranged in juxtaposition against the flat side of the belt C. By reason of the fact that the bracket 13 is susceptible of adjustment on the standard 10, it is obvious that the roller 17 can be quickly and conveniently arranged in proper working relation with the belt. If desired, the device may be arranged obliquely with relation to the belt, so that the edge of the latter touches the roller in only one place, and in this way the device may be used at any place along the belt and particularly adjacent the pulley over which the belt is trained, as distinguished from the flat side of the belt midway between the ends thereof. The invention is very simple in construction and can be manufactured and sold at a nominal cost, and is particularly advantageous for the purpose for which it is intended.

While it is believed that from the foregoing description the nature and advantages of the invention will be readily understood, I desire to have it known that I do not limit myself to what is herein shown and described, and that such changes may be resorted to when desired as fall within the scope of what is claimed.

Having thus described the invention, I claim:—

A device of the character described comprising a standard having a vertical series of spaced openings, a pair of spaced parallel prongs depending from the lower end of the standard, forming an integral part thereof, and adapted to be driven into the ground, a substantially U-shaped member arranged vertically with relation to the standard, an apertured lug projecting from the intermediate portion of the said U-shaped member, and adapted to be attached to the standard, a fastening element adapted to be passed through said lug and any one of said openings of the standard, whereby the said U-shaped member is capable of adjustment on said standard, a roller journalled between the parallel extremities of the U-shaped member, ball bearings for said roller and means for adjusting all of said bearings to compensate for wear.

In testimony whereof I affix my signature.

ELMER A. KILMER.